United States Patent [19]

Ojha

[11] Patent Number: 5,274,468
[45] Date of Patent: Dec. 28, 1993

[54] REPRODUCTION APPARATUS AND METHOD WITH USER-DEFINABLE EDITING AND MACHINE OPERATION FUNCTIONS

[76] Inventor: Purnendu S. Ojha, Eastman Kodak Company, 343 State St., Rochester, N.Y. 14650-2201

[21] Appl. No.: 722,719

[22] Filed: Jun. 27, 1991

[51] Int. Cl.$^5$ .............................................. H04N 1/40
[52] U.S. Cl. .................................. 358/448; 358/467; 358/470; 382/61
[58] Field of Search ............... 358/452, 401, 448, 453, 358/470, 447, 462, 464, 467; 382/9, 61; 355/218, 328, 200

[56] References Cited

U.S. PATENT DOCUMENTS

| | | | |
|---|---|---|---|
| 3,914,043 | 10/1975 | McVeigh | 355/4 |
| 4,248,528 | 2/1981 | Sahay | 355/14 R |
| 4,538,182 | 8/1985 | Saito et al. | 358/80 |
| 4,558,374 | 12/1985 | Kurata et al. | 382/9 |
| 4,760,606 | 7/1988 | Lesnick et al. | 382/61 |
| 4,763,161 | 8/1988 | Forest et al. | 355/14 SH |
| 4,777,510 | 10/1988 | Russel | 355/7 |
| 4,862,217 | 8/1989 | Russel | 355/7 |
| 4,884,097 | 11/1989 | Gianneti et al. | 355/23 |
| 4,896,208 | 1/1990 | Moriya et al. | 358/78 |
| 4,956,667 | 9/1990 | Gartner | 355/202 |
| 4,972,228 | 11/1990 | Stubler | 355/218 |
| 4,987,447 | 1/1991 | Ojha | 355/204 |
| 5,075,787 | 12/1991 | Shaughnessy et al. | 358/448 |
| 5,138,465 | 8/1992 | Ng et al. | 355/200 |
| 5,204,515 | 4/1993 | Yoshida | 382/61 |

OTHER PUBLICATIONS

U.S. patent application Ser. No. 407,183 filed in the names of Shaughnessy et al.

Primary Examiner—Edward L. Coles, Sr.
Assistant Examiner—Jerome Grant, III
Attorney, Agent, or Firm—Mark Z. Dudley

[57] ABSTRACT

Apparatus and method for reproduction of an original document wherein image information on the document is selected by character-coding to designate the information for treatment according to one or more particular selective editing or machine control functions. Each character code is predefinable by the user by marking one or more code definition sheets. The documents and code definition sheets are placed in a document handler and passed over a scanner that is sensitive to the image information, the character coding, and the markings on the code definition sheets. The sensed image information is processed according to a determination of the desired functions. A marking engine then provides hard copy reproductions of the original documents from the processed image information.

27 Claims, 9 Drawing Sheets

—70M  Basic Code Definition Sheet

Write a code of your choice in the area under the word "CODE" and fill in the areas ("[ ]") corresponding to the features you wish to assign to the code.

Unless specified otherwise, definition on this sheet will be saved for current job; (definitions can be changed within a job by having more than 1 definition sheet)

Code  [ ] Save in copier memory  [ ] Save into Power-up setup
  [ ] Save until power off   [ ] Save to Job memory card Selections from Control Panel will be used for features not defined below:
Original > Copy sides: [ ] 1>1 [ ] 1>2 [ ] 2>1 [ ] 2>2
[ ] Front Cover   [ ] Back Cover   [ ] Both Covers
[ ] Staple        [ ] Saddle Stitch
[ ] For whole job,  [ ] For 1 page,
For  [1] [2] [3] [4] [5] [6] [7] [8] [9]  x10
     [1] [2] [3] [4] [5] [6] [7] [8] [9]  x1 pages Accent color (foreground):[X] Red [ ] Green [ ] Blue
Highlight (background):   [ ] Red [ ] Green [ ] Blue
Paper: [ ] Main Supply    [ ] Upper Cassette [ ] Lower Cassette
[ ] Image Reverse
Image Shift [ ] Left   [ ] Right
    [ ] 2mm, [ ] 5mm, [ ] 10mm, [ ] 20mm, [ ] 50mm
Photo/text:
[ ] text only, [ ] photo (snapshot), [ ] photo (magazine), [ ] text + graphics
Reduction/Enlargement:
[ ] Auto, [ ] 64%, [ ] 77%, [ ] 98%, [ ] 121%
Page specific features:
[ ] Chapter, [ ] Z-fold, [ ] Blank Insert, [ ] Printed Insert, [ ] Pause
Paper: [ ] Main Supply,    [ ] Upper Cassette,
       [ ] Lower Cassette, [ ] Insert Tray
Area only Features (codes representing appropriate features can be used for areas even if defined for a page/job):
    [ ] Erase area, [ ] Erase outside area, [ ] Fill area,
    [ ] Fill outside area, [ ] Move area to center of page

FIG. 5A

||||||||— 70M  Code Definition Sheet for Area only Features

Write the code of your choice in the area under the word "CODE" and fill in the areas ("[ ]") corresponding to the features you wish to assign to the codes.

Definition(s) on this sheet will be saved for current job (definitions can be changed within a job by having more than 1 definition sheet)

Code    [ ] Erase area [ ] Erase outside area, [ ] Fill area
         [ ] Move area to center of page [ ] Fill outside area
         [ ] Image Reverse
         Accent color (foreground):[ ] Red [ ] Green [ ] Blue
         Highlight (background):    [ ] Red [ ] Green [ ] Blue
         Photo/text:
         [ ] text only, [ ] photo (snapshot), [ ] photo (magazine),
         [ ] text + graphics
         Reduction/Enlargement:
         [ ] 35%, [ ] 64%, [ ] 77%, [ ] 98%, [ ] 121%, [ ] 400%
         [ ] Lighten area, [ ] Darken area, [ ] Pause
[ ] No character in loop Code    [ ] Erase area [ ] Erase outside area, [ ] Fill area
         [ ] Move area to center of page [ ] Fill outside area
         [ ] Image Reverse
         Accent color (foreground):[ ] Red [ ] Green [ ] Blue
         Highlight (background):    [ ] Red [ ] Green [ ] Blue
         Photo/text:
         [ ] text only, [ ] photo (snapshot), [ ] photo (magazine),
         [ ] text + graphics
         Reduction/Enlargement:
         [ ] 35%, [ ] 64%, [ ] 77%, [ ] 98%, [ ] 121%, [ ] 400%
         [ ] Lighten area, [ ] Darken area, [ ] Pause
[ ] No character in loop Code    [ ] Erase area [ ] Erase outside area, [ ] Fill area
         [ ] Move area to center of page [ ] Fill outside area
         [ ] Image Reverse
         Accent color (foreground):[ ] Red [ ] Green [ ] Blue
         Highlight (background):    [ ] Red [ ] Green [ ] Blue
         Photo/text:
         [ ] text only, [ ] photo (snapshot), [ ] photo (magazine),
         [ ] text + graphics
         Reduction/Enlargement:
         [ ] 35%, [ ] 64%, [ ] 77%, [ ] 98%, [ ] 121%, [ ] 400%
         [ ] Lighten area, [ ] Darken area, [ ] Pause
[ ] No character in loop

FIG. 5B

|||||||— 70M  Code Definition Sheet for User ABC

Code
[R]

72 —
71 —

74 —

[ ] Chapter, [ ] Z-fold, [ ] Blank Insert, [ ] Printed Insert, [ ] Pause
Paper: [ ] Main Supply, [ ] Upper Cassette, [ ] Lower Cassette,
[ ] Insert Tray, [ ] Erase area, [ ] Erase outside area,
[ ] Fill area, [ ] Fill outside area, [ ] Move area to center of page
[ ] For whole job, [ ] For 1 page
Accent color (foreground): [X] Red [ ] Green [ ] Blue
[ ] Image Reverse
Photo/text:
[ ] text only, [ ] photo (snapshot), [ ] photo (magazine),
[ ] text + graphics
Reduction/Enlargement:
[ ] Auto, [ ] 64%, [ ] 77%, [ ] 98%, [ ] 121%, [ ] 400%

[ ] No character in loop                                    74P —

76-1C

Code
[S]

72 —
71 —

[ ] Chapter, [ ] Z-fold, [ ] Blank Insert, [ ] Printed Insert, [ ] Pause
Paper: [ ] Main Supply, [ ] Upper Cassette, [ ] Lower Cassette,
[ ] Insert Tray, [ ] Erase area, [ ] Erase outside area,
[ ] Fill area, [ ] Fill outside area, [ ] Move area to center of page
[ ] For whole job, [ ] For 1 page
Accent color (foreground): [ ] Red [ ] Green [ ] Blue
[ ] Image Reverse
Photo/text:    — 74H
[ ] text only, [X] photo (snapshot), [ ] photo (magazine),
[ ] text + graphics
Reduction/Enlargement:
[ ] Auto, [ ] 64%, [ ] 77%, [ ] 98%, [ ] 121%, [ ] 400%

[ ] No character in loop 76-2C

Code
[ ]

72 —

[ ] Chapter, [ ] Z-fold, [ ] Blank Insert, [ ] Printed Insert, [ ] Pause
Paper: [ ] Main Supply, [ ] Upper Cassette, [ ] Lower Cassette,
[ ] Insert Tray, [ ] Erase area, [ ] Erase outside area,
[ ] Fill area, [ ] Fill outside area, [ ] Move area to center of page
[ ] For whole job, [ ] For 1 page
Accent color (foreground): [ ] Red [ ] Green [ ] Blue
[ ] Image Reverse
Photo/text:
[ ] text only, [ ] photo (snapshot), [ ] photo (magazine),
[ ] text + graphics
Reduction/Enlargement:
[ ] Auto, [ ] 64%, [ ] 77%, [ ] 98%, [ ] 121%, [ ] 400%

[ ] No character in loop 76-3C

REPRODUCTION APPARATUS AND METHOD WITH USER-DEFINABLE EDITING AND MACHINE OPERATION FUNCTIONS

CROSS REFERENCE TO RELATED APPLICATION

This application is related to U.S. patent application Ser. No. 407,183, filed on Sep. 14, 1989 in the name of Shaughnessy et al. and entitled REPRODUCTION APPARATUS AND METHOD WITH ALPHANUMERIC CHARACTER-CODED HIGHLIGHTING FOR SELECTIVE EDITING.

1. Field of the Invention

The present invention relates to electrophotographic reproduction apparatus and methods and, more specifically, to improvements in specifying selective editing and machine operation functions in the reproduction of an original document.

2. Brief Description of the Prior Art

Some conventional document reproduction apparatus include selective editing functions whereby one or more portions of the image information on the original document sheet may be reproduced according to a special treatment known as an editing feature or editing function, e.g., the information is erased, accented in color, reduced or enlarged, and so forth. Accordingly, some means must be provided for identifying the portions of a document sheet that are to be selectively edited. For example, in U.S. Pat. No. 4,777,510, an apparatus and method for electrophotographic reproduction is disclosed wherein areas of spot color or other special treatment may be effected. An original document sheet that, for example, is to be reproduced with spot color, is highlighted by use of a highlighting marking pen in the areas in which spot color is desired. The original is then scanned by the apparatus to provide signals regarding the locations of the areas of image information to be specially treated. The reproduction apparatus includes a control panel with input keys for indicating the desired modes of treatment. Once a color, for example black, is chosen for reproduction of the non-highlighted information, the operator may choose to have the highlighted information reproduced in red, green, or blue.

Simply marking multiple areas for selective editing does not indicate which of several selectable editing functions should be applied to a particular area. Conventional apparatus is incapable of distinguishing between several highlighted areas when different editing functions are to be applied to more than one area. Hence, in the prior art, all highlighted areas on one sheet are usually treated alike. In U.S. Pat. No. 4,777,510, code marks written in a selected margin area of the original can be used to distinguish between different areas of highlighted information. In lieu of a code, different highlight inks may be sensed for distinguishing between two or more areas. However, the aforementioned method is still difficult to use in that a marginal mark is esoteric (the mark is not immediately recognizable as a symbol of its respective editing function) and many reproduction jobs require that more than one editing function be applied to a particular original sheet. The placement of marks at the margin can create ambiguity, in that the positioning of a mark is critical with respect to the highlighted area.

Furthermore, the conventional approaches to providing selective editing functions are in need of simplification by, for example, the elimination of the use of dedicated control keys to identify editing functions. Key operation is not only a time consuming task but also it is also becomes repetitive for some often-used editing or control functions. Key operation is also feasible only at the apparatus chosen for making the copies. In contrast, the task of editing—which typically entails the selection of at least one special treatment per original document page in a multipage document set—is often done best (or most conveniently) at a place away from the reproduction apparatus, that is, off-line. The task is typically performed during the usual document creation effort at a desk, workstation, or other location remote from the copier.

The person preparing an original document for reproduction (hereinafter a "user") needs to be able to identify a particular area and then add distinguishing information to the identified area in a quick, simple, and familiar motion. Furthermore, the typical user needs to specify not just editing functions but also machine operation functions as well--such as copying in duplex mode, page insertion or chapterization, folding or stapling, and the like.

Accordingly, there is disclosed in copending, commonly assigned U.S. patent application Ser. No. 407,138 an apparatus and method for electrophotographically reproducing an original document sheet wherein selective editing functions are more simply and accurately accomplished. An original document sheet that is to be reproduced with special treatment of the information contained thereon is highlighted in the area or areas in which treatment is desired. Additionally, according to an alphanumeric character-coding scheme, one or more characters are written within one or more of the highlighted areas. The Original is then scanned by the apparatus to provide signals regarding the locations of the highlighted areas of image information to be specially treated. Character recognition is employed to detect each character drawn using the highlighter and a corresponding editing function (or a default mode, if no character is recognized) is selected for the respective highlighted area.

However, the simplified approach disclosed in the Ser. No. 407,138 application is still amenable to improvement. The foregoing scheme requires that the user choose each character code from a pre-programmed library of characters for recognition by the character recognition software. The library is easily programmable according to the needs of the most users, but it will be appreciated that the available editing features are nonetheless selectable only according to the set of characters stored in the predetermined library. Furthermore, those characters may or may not conform to a type or category of character codes preferred by each and every user. For example, one user may prefer to use numerical codes to identify the certain editing functions, whereas another user may prefer alphabetical characters to denote the same editing functions, and another may prefer proofreader's marks, and so on. It is conceivable that the character code library could be re-programmed before each reproduction job to suit the user's preference of character codes, but such a habit would be tedious and impractical. Thus, the character code for each editing function in each reproduction job is not easily user-definable.

As a result, the user is required to know in advance (i.e. before highlighting a sheet to be copied) the character code that will be associated by the reproduction apparatus with a certain editing function. This problem forces the casual user to refer to some reference, such as a guide or chart, for the proper character codes to use when highlighting a document. In addition, the character code library in any one reproduction apparatus must be programmed to suit the preferences of the many users who may happen to use that machine--which is a difficult programming task.

SUMMARY OF THE INVENTION

The invention pertains to an apparatus and method for reproducing image information on an original document sheet so that selected image information is reproduced according to a desired selective editing function, a machine control function, or a plurality or combination of such functions known as a macroinstruction.

A code definition sheet is provided for establishing a user-defined library of character codes and one or more respective selective editing functions, machine control functions, or macroinstructions. The code definition sheet includes first means for specifying a character code and second means for identifying at least one function or macroinstruction to be represented by the character code. The character code may then be used to indicate the function to be carried out for an area on an original, an original sheet, or a plurality of sheets, depending on how the character code is specified and used. Image information on the document sheet may be selected for selective editing, for example, by highlighting the image information and by providing the character code at a position associated with the highlighting.

The document sheet and the code definition sheet are scanned to determine the selected image information and the function or macroinstruction to be performed with respect to the selected image information. The selected image information is then reproduced according to the desired function or macroinstruction. The code definition sheets are not reproduced.

Each code definition sheet preferably includes plural sets of the first and second means such that more than one character code and respective functions or macroinstructions may be easily defined.

BRIEF DESCRIPTION OF THE DRAWINGS

The subsequent description of the preferred embodiment of the present invention refers to the attached drawings wherein.

DETAILED DESCRIPTION OF THE PREFERRED EMBODIMENTS

Because electrophotographic reproduction apparatus are well known, the present description will be directed in particular to elements forming part of or cooperating more directly with the present invention. Apparatus not specifically shown or described herein are selectable from those known in the prior art. For convenience, "copier" and "electrophotographic apparatus" are used herein broadly, and such terms are intended to apply to many types of image reproduction apparatus, such as copiers, copier/duplicators, and laser printers, unless such application is clearly inappropriate.

Figure 1:
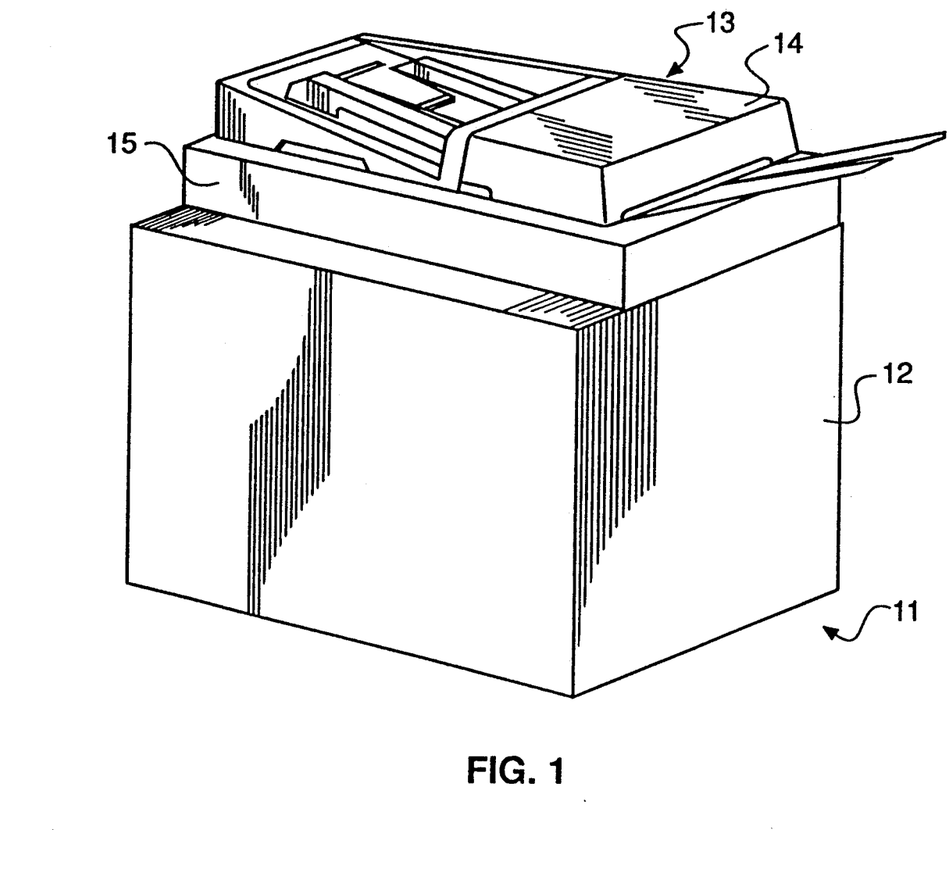
FIG. 1 is a perspective view of one embodiment of an electrophotographic copier for practice of the present invention.

With reference now to FIG. 1, an electrophotographic reproduction apparatus, or copier 11, is made up of a marking engine 12 and a scanner 13. The scanner 13 includes a document handler 14 and an optical system enclosed in an optics housing 15. Details of one suitable document handler 14 are disclosed in commonly-assigned U.S. Pat. No. 4,884,097 filed in the names of Giannetti et al. on Dec. 24, 1987, the disclosure of which is incorporated herein by reference.

Figure 2:
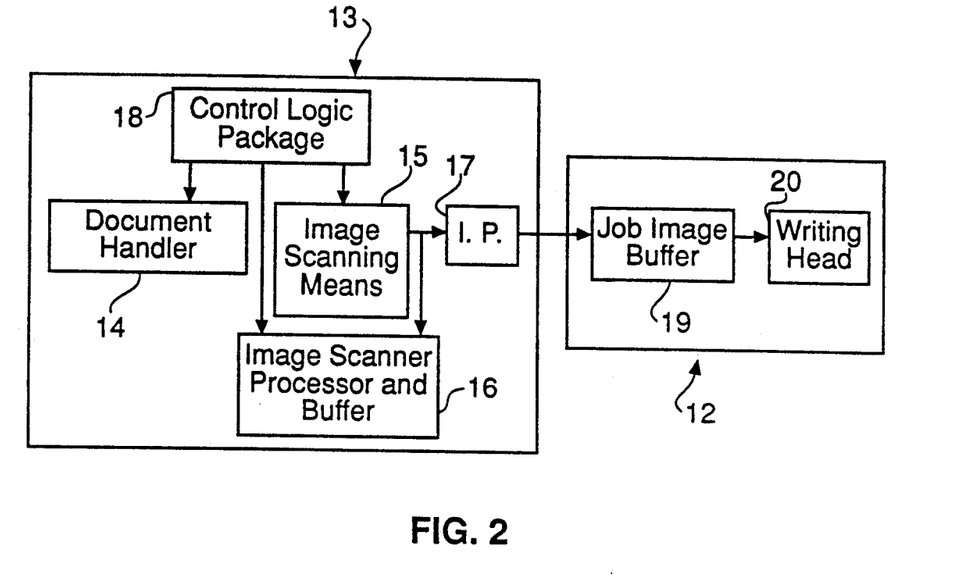
FIG. 2 is a schematic block diagram of the copier of FIG. 1.

Referring to FIG. 2, scanner 13 includes the automatic document handler 14 for stream feeding hardcopy input originals to be automatically read by image scanning means 15 having an image acquisition device such as a linear array of solid-state charge-coupled image sensors. The image scanning means 15 scans the input originals and converts their images to electronic bit stream data in page format for input to marking engine 12. This data is manipulated by an image scanner processor and buffer 16 and image processing electronics 17 having algorithms for selective editing and for enhancing the image data for the electrophotographic process carried out by the marking engine 12.

Scanner 13 also includes a control logic package 18 having an operator control panel for the operator to input some selective editing and machine control functions and for messages received from the copier 11. Setup information is input to the scanner 13 and information for the finishing and processing of jobs will also be sent to marking engine 12. The control logic package 18 includes control software, interface and communications software, and logic hardware. The contemplated scanner 13 may also be constructed to include random access memory (RAM), read only memory (ROM), digitization electronics, and forms generation electronics according to the teachings of U.S. Pat. No. 4,987,447, issued to applicant on Jan. 22, 1991, the disclosure of which is included herein by reference.

Marking engine 12 is the output device that will receive and store processed image data in its job image buffer 19 and appropriately process that data to produce hard copies. The job image buffer stores the bit stream data for each of the pages being copied and delivers the data to a writing head 20 as necessary for sequential copying. The marking engine 12 incorporates other known paper handling and reprographic process hardware (not shown) in addition to the writing head 10.

Figure 3:
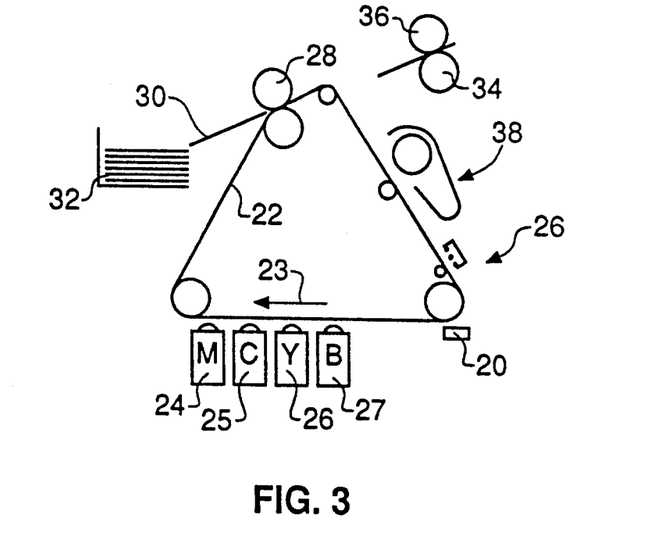
FIG. 3 is a schematic front elevational view of the copier of FIGS. 1 and 2 showing the general arrangement of electrophotographic reproduction apparatus in accordance with one embodiment of the invention.

FIG. 3 schematically illustrates the electrophotographic apparatus of copier 11, including an image transfer member such as photoconductive belt 22. Belt 22 is moved in a clockwise direction, as represented by arrow 23. A primary charging station 26 applies an electrostatic charge to belt 22. At an exposure station 20, projected light dissipates the electrostatic charge on the photoconductive belt to form a latent electrostatic image corresponding to the image of the original to be copied or printed. Exposure station 20 preferably operates using a modulated light output device that is modulated by the bit stream representation of the original image to be reproduced. The exposure station 20 is therefore preferably a laser scanner producing a modulated scanning laser beam, or an array of light emitting diodes adapted for exposing the photoconductive belt.

The latent electrostatic image on belt 22 is developed with toner at one or more developer stations 24–27. The developer stations are illustrated as being four separate stations 24, 25, 26 and 27 for processing respective color separation images; the stations preferably contain magenta, cyan, yellow, and black toner, respectively. Although composite four-color capability is illustrated, the present invention is applicable also to monochromatic images also.

As the toner image on belt 22 approaches a transfer station 28, an image receiver sheet 30 is fed from a supply 32. After transfer of the toner image to the receiver sheet, the receiver sheet is passed through a pair of heated fuser rollers 34 and 36. Mechanical and electrical cleaning of belt 22 is effected at a cleaning station 38.

Although not shown, other methods and apparatus for exposure of the original sheet D are possible. For example, the image may be scanned and imaged upon the photoconductor using a scanning reflection exposure of the original instead of using light which has been electronically generated by the exposure station 20 from a data stream. However, it is preferable that some of the selective editing and machine control functions to be described below are incorporated into the scanner processor 16 and electronic image processing electronics 17 so as to be accomplished electronically, such that the edited image in a bit stream form is then provided to the marking engine 12 for exposure by the writing head 20.

Figure 4:
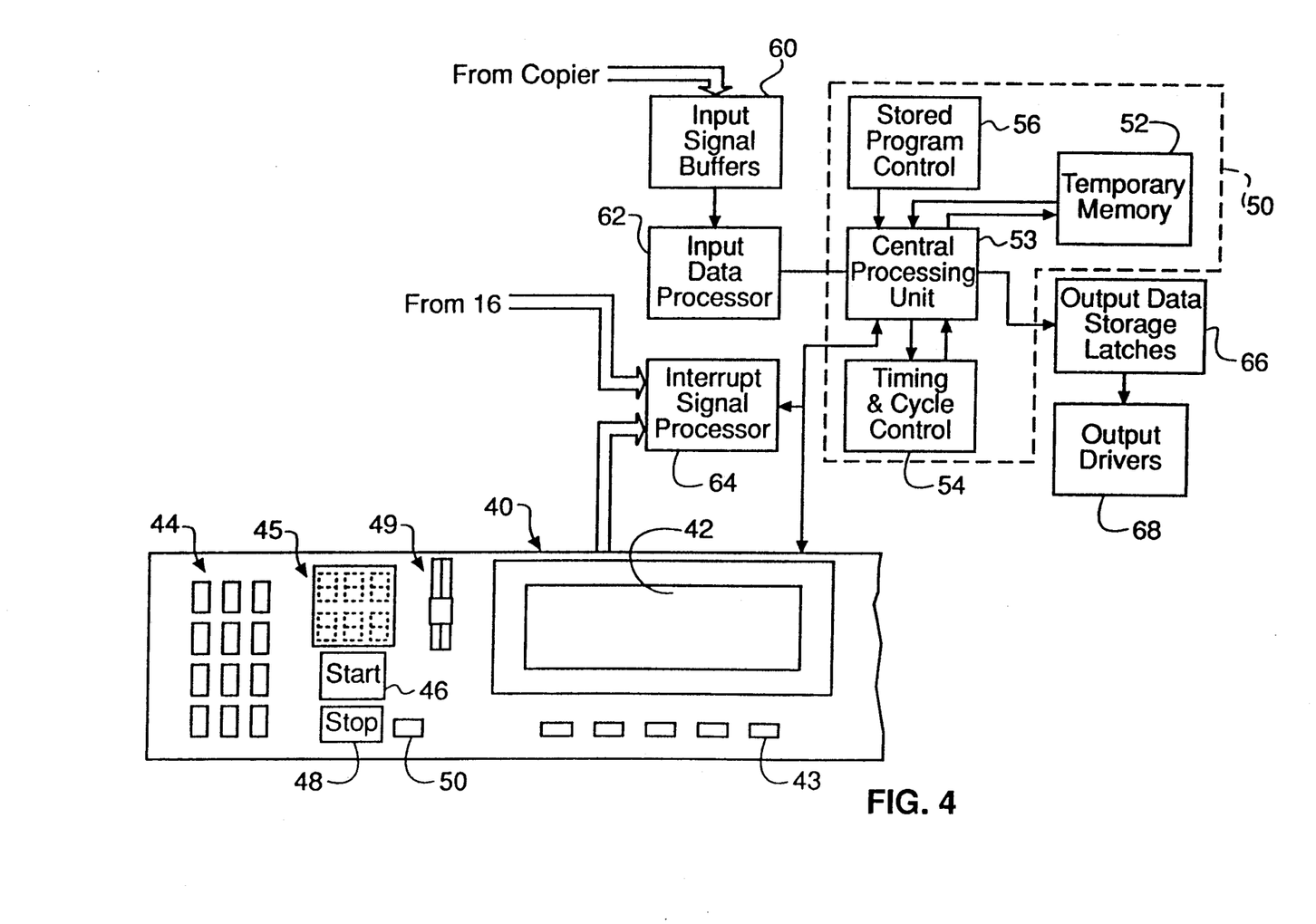
FIG. 4 is a view of an operator control panel and a block diagram representation of a portion of the control logic package of the copier of FIGS. 1-3.

The preferred embodiment of a control logic package 18 includes a logic and control unit (LCU) and an operator control panel to control the electrophotographic process based in part on operator commands and on the instantaneous location of the belt 22. With reference now to FIG. 4, there is shown a block diagram of a portion of the control logic package 18, including the operator control panel 40 and the LCU 50. The operator control panel 40 includes a display 42 upon which messages are shown to indicate the mode of operation, location of malfunctions in the copier, etc. Panel 40 includes soft keys 43 below display 42, a data entry key pad 44, a digital display 45, a "start" button 46, a "reset/stop" button 48, and an "interactive mode" button 50. The operator may interactively communicate with the control logic package by activating the interactive mode button 50 and responding to queries and menus displayed on the display 42 by use of the soft keys 43. This interactive mode may call for machine readable data to be downloaded or uploaded, whereupon the operator may also use an input/output data port 49 to insert an appropriately readable and/or writeable data storage medium (not shown), such as a magnetic card, magnetic floppy disk, or optical disk.

The LCU 50 includes temporary data storage memory 52, central processing unit 53, timing and cycle control unit 54, and stored program control 56. Input data are applied either through input signal buffers 60 to an input data processor 62 or to interrupt signal processor 64. The input data are derived from various switches, sensors, and analog-to-digital converters. Input data and control signals from the LCU 31 are applied to storage latches 66 and then to output drivers 68 which transmit the signals to the various work stations, mechanisms, and controlled components associated with the apparatus. For example, data processed by the LCU 50 is used to indicate the number of copies to be made.

The central processing unit 53 includes an embedded controller, preferably a microprocessor, which is responsive to the input signals from the copier for sequentially operating the copier work stations and other machine functions. The programming of a commercially-available microprocessor is a conventional skill; the particular details of any such program would depend on the architecture of the designated microprocessor and need not be treated here.

The above embodiment of the control logic package 18 is contemplated as optionally including signal communications circuitry included in the output drivers 68 for supplying the digitized and processed image data signals on a bidirectional communications bus to a remote print engine, visual display device, computing workstation, or other image-forming apparatus such as a facsimile machine, plotter, lithographic or linotype printer, or the like. Hence, the signal output from the image scanner 16 and the bit map provided by the image scanner processor and buffer 16 and image processing electronics 17 may be selectably transmitted to another copier or printer. For example, transmission of the document page to a remote printer would allow the edited version to be merged into another document for subsequent printing on a linotype press. The signals for transmission may be prepared under the control of the central processing unit 33 for transmission on, for example, a local area network (LAN) or a modem and telephone line (not shown) that is connected to the output side of the output drivers 48.

Figure 5A:
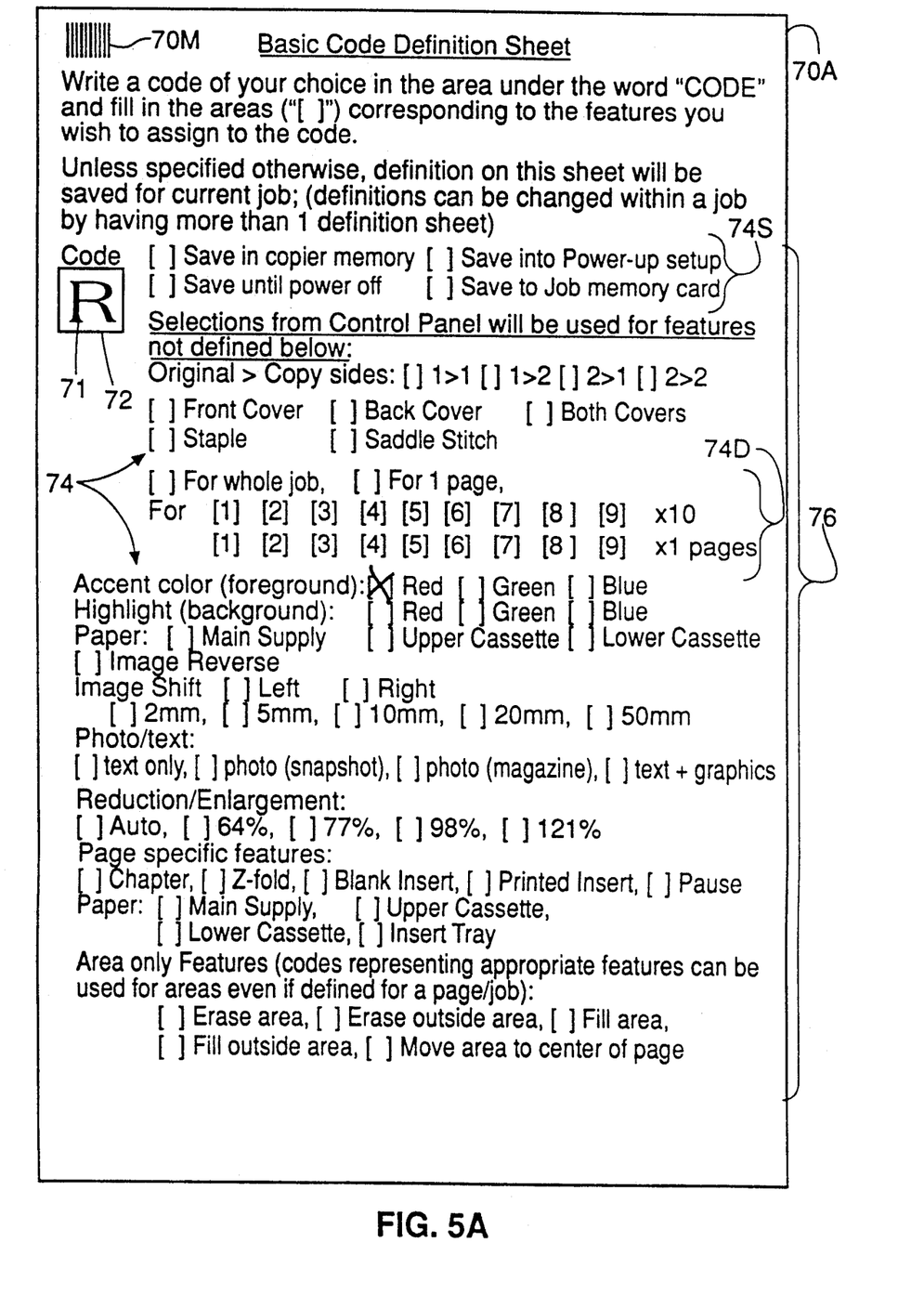
FIGS. 5A, 5B, and 5C are illustrations of code definition sheets for use with the copier of FIGS. 1-3.
Figure 5B:
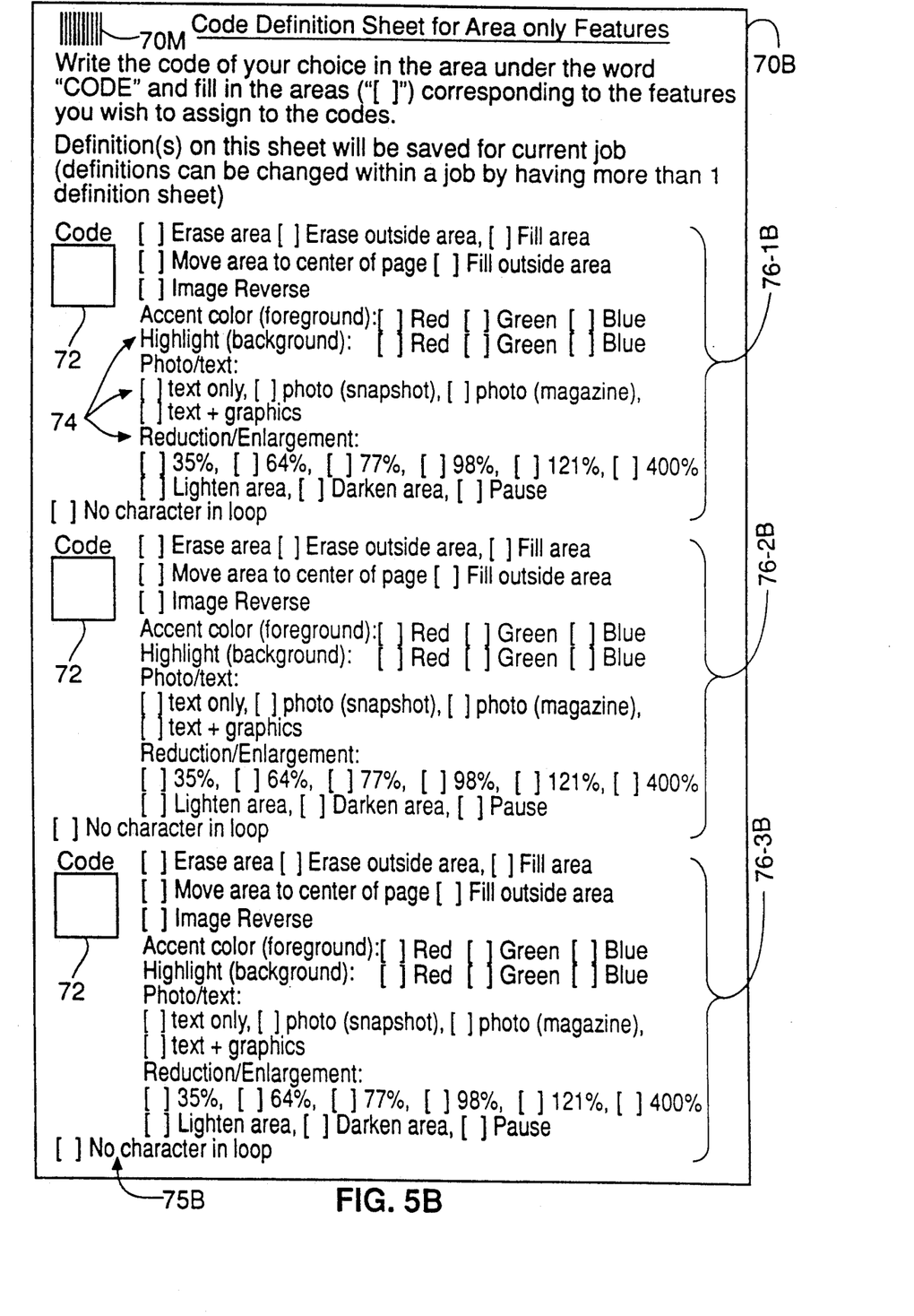
Figure 5C:
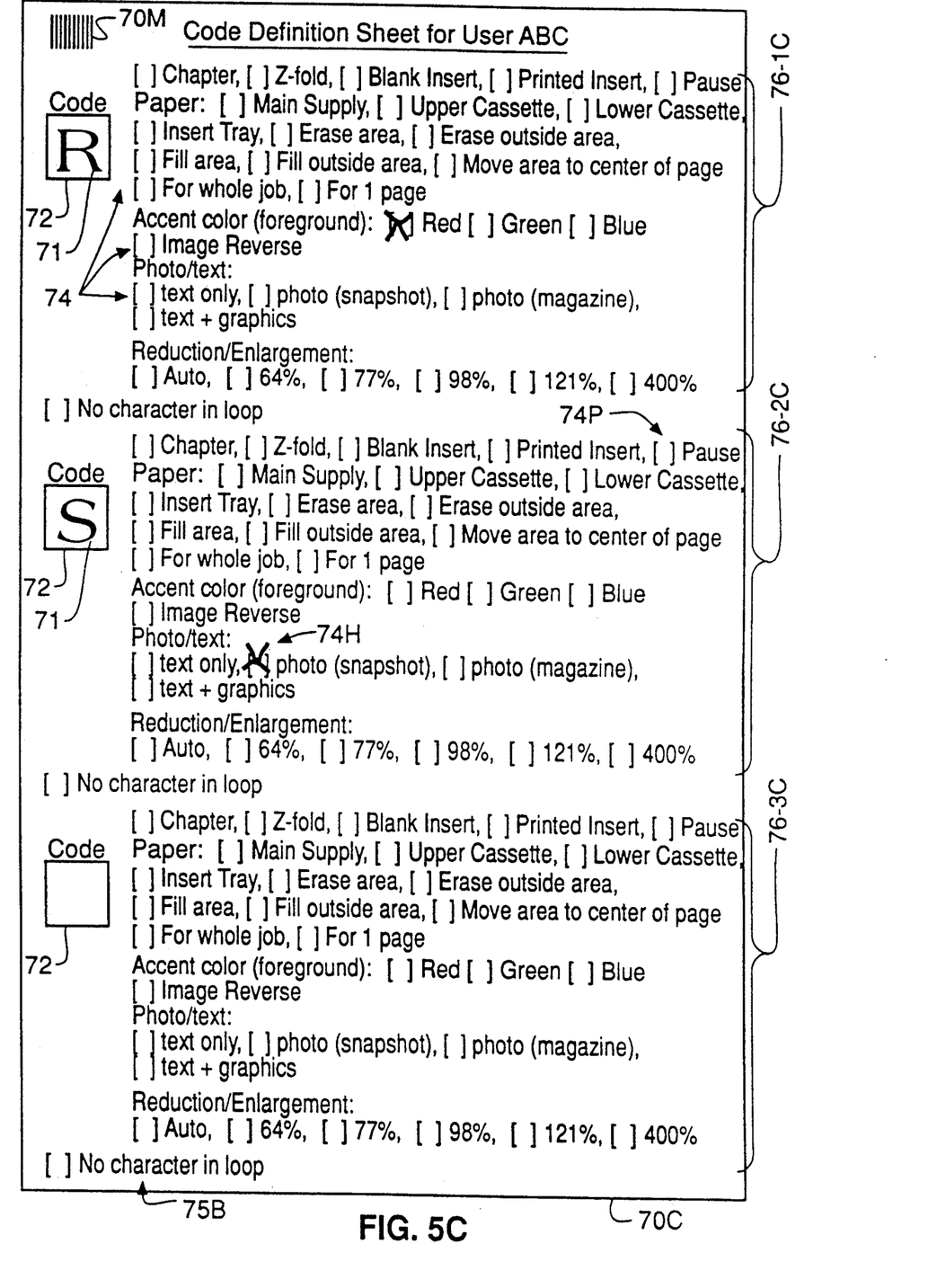

As shown in FIGS. 5A through 5C, the user will define each character code that will be associated with a respective selective editing function or machine control function, hereinafter categorically referred to as a function, by completing one or more code definition sheets 70A, 70B, 70C. Also, a plurality of editing and/or control functions may be combined in what is termed herein a macroinstruction.

Each sheet 70A, 70B, and 70C is preprinted to offer a particular array of optional functions; a plurality of any one or all of the sheets may be used. The particular array of functions preprinted on any one sheet are known to the reproduction apparatus by a machine readable sheet identification mark 70M (a bar code, for example, is shown which respectively differs in its line spacing, etc., according to whether it lies on code definition sheet 70A, 70B, or 70C).

The user is therefore free to select a particular version of these readily-available code definition sheets. By entering a specific character code 71 in a character code box 72 and by checking off one or more optional (i.e., user-selectable) functions 74 that such the character code is intended to represent, the user may begin to define a character code library to be used by the image scanner processor and buffer 16. All of the entries on the code definition sheet 70 may be made by a conventional machine-readable ink pen or pencil, or by use of a highlighting instrument to be described with respect to FIG. 7.

Code definition sheet 70A offers a large selection of optional functions 74 in a menu 76 of and thus preferably is devoted to one or perhaps two blank character code entry boxes 72 (in the illustration, there is only one box 72.) For versatility, another code definition sheet 70B includes a greater number of duplicate menus 76-1, 76-2, ... 76-N each of which have a reduced selection of less functions 74. The plurality of character code boxes 72 allow the user to define several character codes 71 whereby some codes include some common functions, and other codes define different functions.

In code definition sheet 70B, the plurality of menus is devoted to functions that are applicable to a specific area on the original, and thus the optional functions 74 are tailored selective editing features such as erase, image reversal, etc. Alternatively, code definition sheet 70B could be tailored more to machine operational functions, such as duplex mode copying.

In code definition sheet 70C, the plural menus are customized, that is, they are designed to offer the mixture of optional functions 74 that are most often used by a certain user (in the illustration, the user is named "ABC").

Selection of a function is made simply by providing a mark in the appropriate area. For example, and as shown, the selective photo (snapshot) mode for an area of the reproduction may be reserved by entering a character 71 ("S" in the illustrated example) in a blank character code box 72 and then checking the appropriately-labelled option 74H in the menu. If several options are selected, and thus one character code is defined as representing more than one function, the resulting combination of editing functions will be carried out as a macroinstruction.

In the illustrated embodiment, the character-codes 71 are alphanumeric and are preferably instantly recognizable by the user. However, it is important to note that the user's choice of a character for a certain character code is entirely arbitrary and need have meaning only to the user. Therefore, according to a significant feature of the present invention, the user is empowered to create a library of user-defined character codes, on as many code definition sheets 70A, 70B, or 70C as necessary, to reflect whatever selective editing and/or machine control functions that the user desires. Accordingly, although the characters used for illustration herein are expected to have common usage, other characters may be adopted to conform to the alphabet, number system, language, custom, or any other conventions or preferences of the user.

Duplicate character codes entered in respective boxes 72 on one code definition sheet 70B will cause the logic package to respond with an error signal on display 42 to the user, unless the function(s) selected for one character code indicates that it should apply only to an area, and the other character code is defined with function(s) that would not apply to an area. Thus, a single character code can be interpreted to mean differing functions depending upon the context of useage and whether or not the character code can be associated with an area of information. When the machine senses such a character code on a document, it will interpret it as meaning the area-only definition when the character code is sensed in association with an area, whereas the character code would be interpreted according to the other definition if the character code is not associated with an area.

For example, a user could enter "B" twice as a character code on one code definition sheet, if the first entry is defined as representing a blue spot color function (which is a function normally interpreted as being applied only to an area) and the second entry is defined as representing a binding and stapling function (which normally applies to the document set.) However, a character code "R" to define red accent color cannot again be entered on the same code definition sheet 70B as "R" to define another area-dependant function, such as image reverse, as both functions must operate on a selected area of image information.

When the requisite number of code definition sheets 70A, 70B, and/or 70C are complete, the user has completely defined a library of character codes (and their respective functions or macros) that will be carried out by the reproduction apparatus. The code definition sheets are then inserted into the document set that is to be reproduced. The code definition sheets can be placed anywhere in the set of original document sheets, although in a preferred embodiment of the invention, the code definition sheet should precede the sheets to be so edited. Furthermore, as shown in code definition sheet 70A, one or more optional functions 74D may be selected to indicate that the character code will apply only to the page on which the character code is associated, to a specified number of pages that include and follow the page, or to the whole reproduction job (all pages).

With respect to the document reproduction job, the user is free to insert successive code definition sheets among succeeding document sheets so as to change the definition of the character codes as they are used throughout a document set. According to this preferred convention, a character code is defined by a first scanned code definition sheet until the scanner 13 encounters the same character code on another (succeeding) code definition sheet. Upon scanning the character code on the second code definition sheet, the character code will be re-defined as specified by the latter sheet, and so on with successive code definition sheets throughout the document set.

As illustrated by optional function 74S in FIG. 5A, it is also contemplated that the control logic package have sufficient memory and associated software and hardware allocated such that the user may request that a particular library of character codes be saved (a) in a personalized memory in the control logic package, (b) on a personalized memory card, (c) in a RAM-based default memory that lasts until power off, or (d) in a power-up ROM-based default library.

In the instance of (a) and (b) with respect to a personal memory or memory card, the control logic would prompt the user via the display 42 to enter the user's identification number by use of the keypad 44, or insert a magnetic card or similar data storage device in the input/output data port 49 in the control panel 40 (cf. FIG. 4). The character code library that the user had defined in the most recently used set of code definition sheets would then be stored in either the control logic package or on the storage medium inserted in the port 49—such that the same user could return to the reproduction apparatus again and carry out such functions without the respective code definition sheets. To do so, the user would alert the reproduction apparatus by entering the identification number and, with use of the interactive dialogue on the display 42, would indicate that the documents to be processed should be carried out according to the selected character code library stored in personal memory. If the necessary character code library was stored on a storage device in lieu of the personal memory in the control logic package, then the user would again insert the storage device in port 49. The reproduction job(s) then desired by the user would be carried out according to the highlighting and character coding on the respective document sheets, and according to the character code library, but without the need for interleaved code definition sheets. It should be noted that the contemplated personalized memory or storage device is capable of storing more than one personal character code library per user.

In the instance of (c) and (d), with respect to power-up and power-off of the reproduction apparatus, it is contemplated that a default library of character codes will reside in another memory portion of the control logic package 18. For example, a power-up default library can be resident in ROM-based memory. This default library would be loaded into RAM-based memory each time the reproduction apparatus is turned on. Also, as will be described below, the ROM-based library can be revised by the key operator or field service representative if the ROM-based memory uses suitable eraseable, electronically-programmable read only memory (EPROM OR EEPROM) devices.

The optional functions described with respect to (c) and (d) are likely to be provided only on special, limited-access code definition sheets that would be available only to certain persons in some applications, such as the "key" operator or the field service representative. Accordingly, a limited-access version of the code definition sheets would be preprintable with a identification mark 70M to indicate that the sheet contains characters to replace (rewrite) the default character code library in the RAM-based memory. The revised RAM-based default library would remain effective until the reproduction apparatus is powered off. Alternatively, the save function 74S can be marked to indicate that the code definition sheet has revisions to the default library resident in the ROM-based memory that is used on powering-up.

It is contemplated that the code definition sheets be pre-printable by the marking engine 12 under the control of form generation circuitry in the control logic package 18. The composition of each code definition sheet would be resident in ROM-based memory, for example, and the composition could be modified by use of the operator control panel 40 to preprint a customized code definition sheet. In this way, the casual user can easily obtain the desired preprinted code definition sheets. In addition, it is contemplated that any user would be able to request a printed listing of the default library resident in the control logic package. Such a printout would be accomplished on a sheet generated by the forms generator in the control logic package and printed by the marking engine 12.

The requisite electronic circuitry capable of forms generation in an electronic printer or duplicator are known in the art. For example, reference may be made to the forms generator discussed in U.S. Pat. No. 4,987,447, issued to applicant on Jan. 22, 1991, the disclosure of which is included herein by reference.

Of course, the preprinting of a limited access code definition sheet (i.e., one useable to redefine a default character code library as discussed above) would be available only to the respective user; for instance, to a key operator upon the entry of a key code or similar on the control panel 40.

Additionally, a preferred embodiment of the code definition sheets 70C includes an optional function 74P for invoking a pause mode. If this function is checked on a code definition sheet, the user can expect that during the reproduction job, the scanner 13 will signal the control logic package 18 to momentarily divert the operation of the reproduction apparatus to a standby mode such that the operator may manually enter the desired function or macro by use of the operator control panel 40 (FIG. 4). (The interactive capability of the display 42 and soft keys 43 will allow the operator to select from a variety of displayed functions.) Operation of the reproduction apparatus will thereafter be returned to its normal mode by use of the start key 46 (FIG. 4). The function or macro that is manually selected may thereby be added to the other functions (if any) checked by the user on the respective menu 76-1, 76-2, . . . 76-N and the overall combination will define the character code to be used by the reproduction apparatus.

Figure 6:
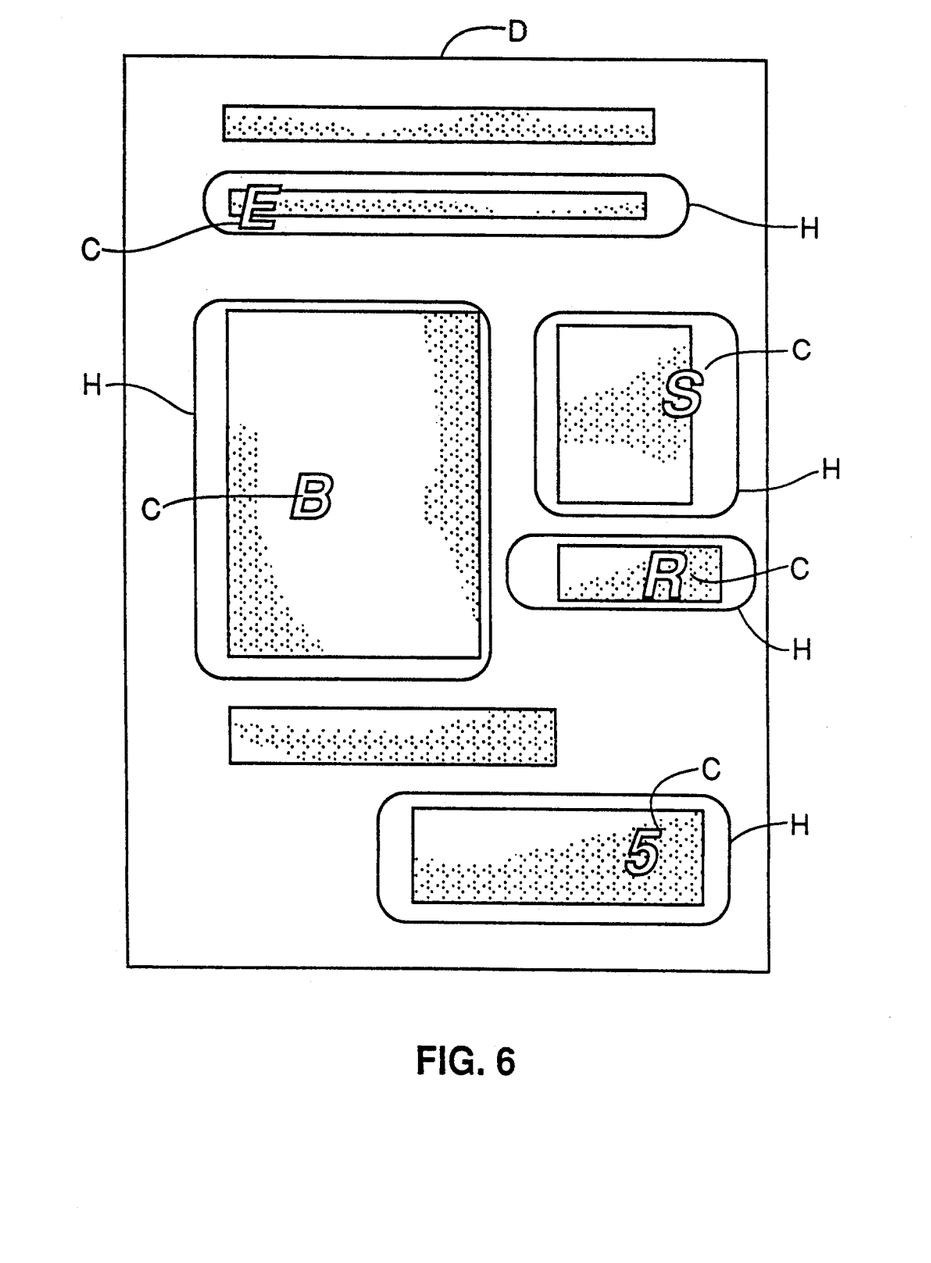
FIG. 6 is an illustration of an original document sheet showing various highlighted areas to be selectively edited by the copier apparatus of FIGS. 1-3.

Turning now to FIG. 6, it will be appreciated that the user is then able to highlight areas on an original document sheet D so as to denote that a predefined function or macro should be applied to the image information enclosed by highlighting material. To specify the functions or macros that should be applied to the highlighted image information, the operator uses a highlighting instrument (not shown) to draw a character code C within a highlighter loop H. If the operator wishes to exclude one or more secondary areas located within a primary encircled area, the operator may again use the highlighting instrument to enclose those secondary areas. As the sets of loops progress inward, the numerical order of each set increases. The even-numbered loops thus define areas that are not treated. Further details on this highlighting process are disclosed in copending U.S. patent application Ser. No. 407,183 the disclosure of which is included herein by reference.

An original document sheet D that is, for example, to be reproduced with color accenting would receive a selected character within each highlighted area in which accent color is desired. In the contemplated reproduction apparatus, accent color is available in four colors. One color, for example black, is used as a color for reproduction of the non-highlighted (background) information. The highlighted information then may be reproduced in red, green or blue. Thus, when accent color in red is desired, a character code ("R" in FIGS. 5A and 6, although any character is suitable) could be applied; this and other selectable color accents are predefinable from the color palette on the code definition sheet 70.

For areas too small for a closed loop, the loop boundary may be reduced to a stroke that covers the area of interest. Because the highlighted area is too small to contain a character code C, the user will select one menu (e.g., menu 76-3B) and the default editing function option 75B is checked (cf. FIG. 5). Any editing functions or macros that are also checked in the respective menu will then be applied to any non-character coded highlighted areas on the document sheet D. A "blank" character code (i.e. no character code in the respective character code box 72) is then considered as having been defined.

In still another alternative, the user may enter a character code on the document sheet without an associated highlighting loop, to indicate that the function should be applied to the entire respective sheet D or to a plurality of such document sheets. The code definition sheets can be placed anywhere in the set of original document sheets, although in a preferred embodiment of the invention, the code definition sheet precede the sheets to be so edited. As shown in code definition sheet 70A (cf. FIG. 5A), one or more optional functions 74D may be selected to indicate that the character code will apply only to the document page on which the character code is located, to the whole reproduction job (all pages), or to a specified number of pages that include and follow the document page.

As further example, and because of the capability for defining macros, in many applications it will be feasible in a single reproduction job to request that sheets of a multisheet document original be reproduced with portions thereof selectively erased, that some sheets be reproduced with accent color, and that the overall document set be organized according to chapterization and/or slip sheet insertion modes. With the use of a conventional recirculating document feeder and extra supply trays for providing slipsheet insertion, a highly productive copier-duplicator may be provided according to the invention for producing finished sets of document copies. The apparatus and method of the invention lends itself quite well to this and other objectives for automatically producing finished sets according to a combined variety of editing and machine operation requirements.

Figure 7:
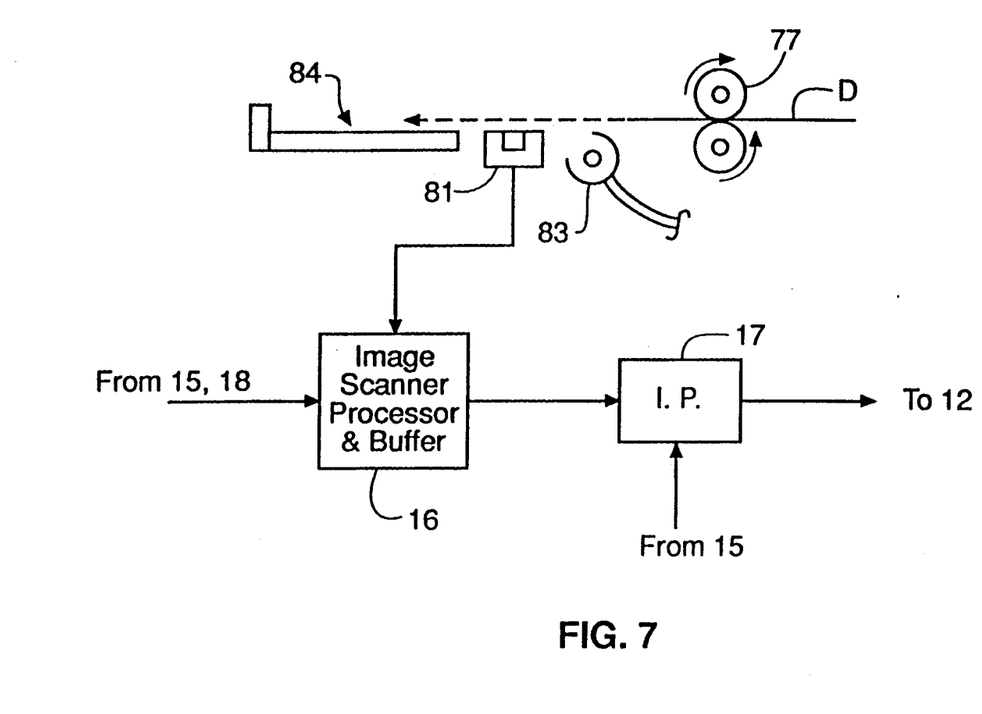
FIG. 7 is a schematic illustrating the image scanning means of FIG. 2 with block diagrams of related processing, buffering, and bit mapping apparatus for use in the apparatus of FIGS. 1-3.
Figure 8:
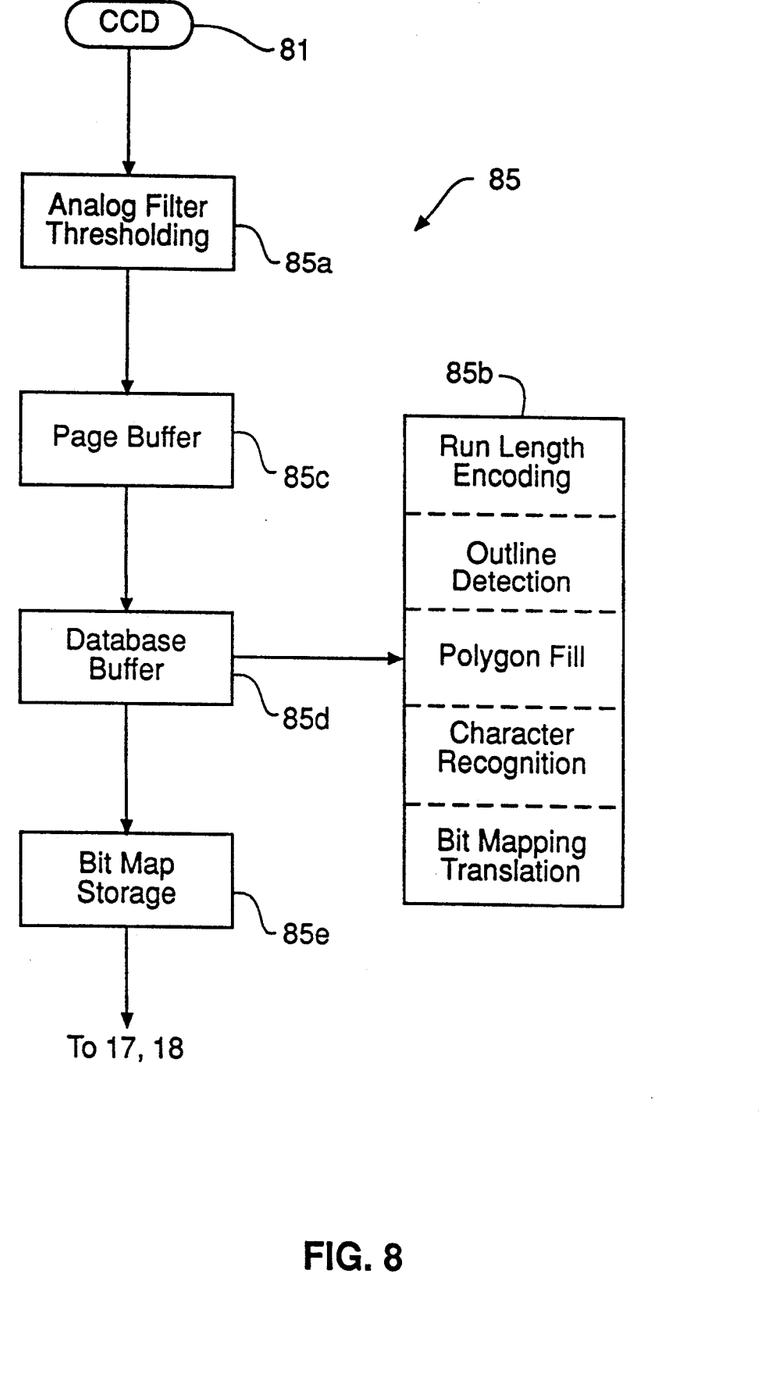
FIG. 8 is a flowchart schematic illustrating the image processing algorithms used in the processing apparatus shown in FIG. 7.

FIGS. 7 and 8 show the image scanning means 15 and the image scanner processor and buffer 16 in greater detail. All the sheets D in a document, including the additional one or more code definition sheets 70, are placed in the document handler 14 for scanning by the image scanning means 15. Each sheet (for example, as shown in FIG. 7, the highlighted document sheet D) is fed into driven rollers 77, which in turn drive the sheet over a sensor array 81. The sensor array 81 is arranged linearly across the transverse direction of the document sheet D to scan the entire sheet as it is transported onto tray 84. The array 81 is similar to those in conventional image scanners except that it includes sensors that are responsive to a threshold level of light of a predetermined spectral bandwidth.

The preferred sensor array 81 comprises a plurality of photoelectric sensors, such as CCD's or photodiodes, that are responsive to light provided by the light source 83 in the spectral range emitted by the conventional marking particles or ink on the sheet D, to the identification mark 70M and pen or pencil marks on the code definition sheets, and to the stimulated emission of ultraviolet (U. V.) light from U. V.-active ink in the highlighting material. Suitable means (not shown) may be provided for detecting the leading and trailing edges of the sheet to provide signals to commence and terminate scanning respectively.

The highlighting material is preferably stimulated by an ultraviolet light source in the light source 83. Appropriate sensors in the sensor array 81 will respond to the particular spectral emission from the highlighting material as distinguished from emissions from the original text or the underlying sheet D. For example, the emission stimulated from any one of a class of sharp cut-off dyes, such as the preferred Europium (III) thenolyl tri-fluoroacetonate, provides a measurable signal difference between the highlighting material and the sheet D, even though some sheets may contain fluorescent whiteners. The phosphors in the source 83 are therefore preferably optimized for stimulating the Europium dye; however, dyes found in the ink from conventional fluorescent highlight pens purchased at a stationery store may be sufficiently activated also.

The image scanning means 15 is also utilized to read and digitally encode the image information (text, pictures, etc.) to be reproduced in accordance with the selective editing functions indicated by the character codes. As each line of the sheet D is scanned, certain sensors detect any highlighted areas directly above them. Other sensors detect the image information (text, pictures, etc.) on the document sheet D. The respective output signals from the sensor array 81 represent the areas of highlighting and image information as a series of analog voltages. Each voltage corresponds to the presence or lack of the emitted light at a resolution of 400 dots per inch (dpi). Thus, the scanning means 15 is preferably used to sense both the image information on the document D and the highlighting material applied thereon by the user. (The patterns of highlighting on any code definition sheets 70 are also read and processed as will be described below, but the code definition sheets are, of course, not reproduced.)

As further illustrated in FIG. 8, the signal from each sensor in the sensor array 81 is fed to the image scanner processor and buffer 16 which logically decides, among other things, which signals represent highlighted areas and which signals represent unhighlighted areas. To do this, an analog filter and threshold section 85a converts the signal resolution from 400 dpi to 25 dpi. The thresholding section 85a may include comparator devices to distinguish highlighted areas from unhighlighted areas on a support that is somewhat reflective to UV light.

After the entire document page has been scanned and stored in a page buffer 85c, the page is processed to create a bit map. Application software residing in the image scanner processor 16 is responsible for encoding the scan data into runlength codes, performing the outline detection algorithm on the runlength codes, generating a bit map, and outputting the bit map. For example, each line of scan data (i.e. a scan line) generated by the sensor array 81 is encoded by a processor 85b into run length codes as it is received from the image scanning means 15. The application software further recognizes each highlighted character, using known character recognition schemes, and associates each character code with the function or macro defined in the code definition sheets.

The resulting database generated in the database buffer 85d is further processed to identify a region that has been completely enclosed, so as to distinguish a closed continuous loop or single stroke of highlighting material. Whether the region defines a closed area or a simply a highlighted stroke (line), or whether the region encloses any other sub-regions, are determined by the outline detection algorithm. A polygon fill algorithm will then translate the areas into the bit map.

Once the database has been completely processed and translated into the bit map, the bit map is ready for output from the bit map storage 85e to the image processing electronics 17 and interrupt signal processor 64 in the control logic package 18.

The function thus identified is then ready to be associated with the respective highlighted area that encloses the respective highlighted character. The function (or the default mode, if the character is absent) is translated to an instruction set suitable for use by the other segments of the reproduction apparatus, such as the control logic package 18 and the image processing electronics 17 to edit the image information scanned from the respective document sheet D.

If the image scanner processor and buffer 16 is unable to process a character code or highlighting loop, the LCU 31 may so inform the operator For example, the LCU may cause an alarm tone to be emitted from an acoustic transducer (not shown) and a message to be displayed at the display window 42 on the control panel 40 shown in FIG. 4. The operator then has the option of removing the code definition sheet 70 or the original document sheet D to examine it for an error or a malfunction such as inadequate or incorrect highlighting, or to see if a default editing function must be specified.

Additional details on the operation of the image scanner processor and buffer 16 are disclosed in commonly-assigned U.S. patent application Ser. No. 407,183 filed in the names of Shaughnessy et al. on Sep. 14, 1989, the disclosure of which is incorporated herein by reference.

It is contemplated that a variety of functions may be predefined according to the invention. The functions themselves, however, are generally known in the art and thus only a few examples are briefly recounted here. For example, Erasure (also known as Deletion or Blanking Mode), wherein the information highlighted is omitted from the copy, is one commonly-used function. Another example is Selective Screen Mode, wherein character coding on the original document sheet may be used to designate areas to be selectively screened.

Another example is Image Shift Mode, wherein a portion of an image may be reproduced in the same or a different color but shifted relative to the x (width) axis or y (height) axis of the sheet D. Other types of image shift as contemplated herein include duplexing wherein a simplex original may have the highlighted portion transferred to the backside of a support either in the same color or a different color from that transferred to the front side. See, for example, U.S. Pat. No. 4,191,465.

Another example is Screen Tint Mode, wherein an area that is highlighted is desired to be overlaid with a screen tint to make it stand out on the page.

Still other examples are Insertion and Chapterization Modes, wherein the highlighting assists in identifying the need for slip sheet insertion or chapterization. For instance, in the chapterization mode, simplex originals may be reproduced in duplex form and thus the first page of a new chapter must start on the front of a new sheet and not be placed on the rear of the last page of the prior chapter.

Another example is Margin Shift Mode, wherein the user defines how much shift is desired to ensure that information is not hidden in the bound area when a multisheet reproduction is bound or stapled into a finished set.

Another example is is Sheet Renumbering Mode, wherein it may be necessary to renumber documents when reproducing a multisheet document original. This can be accomplished by having an area covered with highlighting material or surrounded by same on each original document sheet where a number is to be reproduced on its corresponding reproduction. As each original is reproduced serially, when the document sheet is exposed onto an image frame, the LCU may actuate the exposure station 20 to expose a different number upon each of the preserved charge areas on each image frame. Thus, the developed image frames provide a finished numbered set of sheets that have the numbers provided by the copier-duplicator apparatus.

For the purposes of this disclosure, "highlighting" refers to the act of marking a sheet by the use of a highlighting instrument; thus, "highlighted" refers to the condition of certain portions of a document sheet or a code definition sheet that have been altered by the instrument's effect. Such highlighting should neither impede the reproduction of the original information (on a document sheet), nor is it reproducible itself, although it preferably is visible to the unaided eye of the user.

Highlighted image information would therefore be information selected by the use of a highlighting instrument. In the preferred embodiment, highlighted image information is enclosed by a continuous loop of highlighting material. However, in the present invention it is contemplated that modifications of the preferred embodiment would encompass various other marking conventions, such as bracketing or underlining.

The term "highlighting instrument" should be interpreted as including any instrument capable of altering the sheet in a fashion such that a highlighted area is distinguishable as a selected area by a corresponding detector in the reproduction apparatus. The highlighting material may be applied simply with a writing instrument. The commonly used felt-tip pen for applying a ultraviolet (UV) active ink, of non-reproducible yellow/green color and preferably transparent so as not to obliterate or mask the area so covered, is preferred. The marks or entries on the code definition sheets may be effected with a pencil or ink pen; alternatively, the entries on the code definition sheet and the character codes and highlighting on the original document sheet D may be drawn with the highlighting instrument, if desired.

The preferred highlighter material, when stimulated by light radiation of short (UV) wavelengths, will emit light so as to be sensed by the scanner 13. However, the highlighting material may alternatively be composed of any one of a variety of compositions which, when present on or in a sheet D, are detectable by a corresponding detection means. In addition to the preferred UV-active ink, such compositions would be characterized as (but not limited to) those exhibiting reflective, conductive, magnetic, radioactive, dielectric, charged (ionic), or optically polarizing attributes. The respective sensor array 81 may simply sense the presence of the highlighting material, or the source 83 may first stimulate the highlighter to respond with a predetermined, characteristic "signature".

Thus, while the invention has been described with regard to a common fluorescent highlighting ink that may be detected through light sensing means, other types of highlighting material are contemplated, such as a transparent magnetic ink useable with a magnetic reader version of the sensor array 81.

The invention has been described in detail with particular reference to the preferred embodiments thereof, but it will be understood that variations and modifications can be effected within the spirit and scope of the invention.

I claim:

1. A method for reproducing image information located on a document sheet, comprising the steps of:
   providing a user created code definition means having first means for specifying a suer selectable character code and second means for defining at least one function to be represented by the character code, the character code and the represented function thus comprising a character code library;

specifying a character code and defining at least one function to be represented by the character code;

selecting image information on the document sheet for reproduction according to the defined function and providing the character code at a position associated with the selected image information;

reading the document sheet and the user created code definition means to determine the selected image information and the defined function; and reproducing the selected image information according to the defined function.

2. The method according to claim 1 wherein a plurality of functions are specified, the plurality thereby constituting a macroinstruction.

3. The method according to claim 1, further comprising the step of redefining a prior-encountered user selectable character code that is identical to a later-encountered user selectable character code, such that at least one function represented by the later-encountered user selectable character code replaces at least one function represented by the prior-encountered user selectable character code.

4. The method according to claim 1 wherein a blank character code is specified and a respective function represented a default mode is defined.

5. The method according to claim 1 further comprising the step of defining a pause mode for manual input of the function.

6. The method according to claim 1 and wherein the reading step further comprises the steps of:
converting the selected image information to electronic image data; and
processing the electronic image data to provide processed image data representative of the image information adjusted according to at least one function.

7. The method according to claim 6, further comprising the step of providing the processed image data to a remote image-forming apparatus.

8. The method according to claim 6, further comprising the steps of:
creating a bit map representation of the processed image data;
imaging the bit map representation upon an electrophotographic image-bearing member to provide a latent image;
developing the latent image with colored marking particles to provide a transferable image; and
transferring the transferable image to a receiver.

9. The method according to claim 1 wherein the step of selecting image information on the document sheet for reproduction according to the defined function further comprises the step of highlighting the selected image information and providing the character code at a position associated with the highlighted information.

10. The method according to claim 9 wherein the character code is provided by application of a highlighting material having an optically-detectable spectral emission characteristic.

11. The method according to claim 9 wherein the highlighting is composed of magnetic ink.

12. The method according to claim 9 wherein the highlighting is performed by application of a highlighting material having an optically-detectable spectral emission characteristic.

13. The method according to claim 12 wherein the highlighting material is provided in a loop which encloses the selected image information.

14. The method according to claim 12 wherein the highlighting material is a fluorescent ultraviolet-active ink.

15. Apparatus for reproducing image information located on a document sheet, comprising:
user created code definition means having first means or specifying at least one user selectable character code and second means for defining at least one function to be represented by the character code, the character code and the represented function thus comprising a character code library;
means for selecting image information on the document sheet for reproduction according to the defined function;
means for providing the character code at a position associated with the selected image information;
means for reading the document sheet and the user created code definition means to determine the selected image information and the defined function; and
means for reproducing the selected image information according to the defined function.

16. The apparatus according to claim 15 wherein the second means further comprises means for defining a plurality of functions, the plurality of functions thereby constituting a macroinstruction.

17. The apparatus according to claim 15, further comprising means for redefining a prior-encountered user selectable character code that is identical to a later-encountered user selectable character code, such that at least one function represented by the alter-encountered user selectable character code replaces at least one function represented by the prior-encountered user selectable character code.

18. The apparatus according to claim 15 wherein the first and second means further comprise:
means for specifying a blank character code; and
means for defining a respective function representing a default mode.

19. The apparatus according to claim 15 wherein the first and second means further comprise means for defining a pause mode, and further comprising means, responsive to the means for defining a pause mode, for manual input of the function.

20. The apparatus according to claim 15, further comprising:
means for specifying that the character code library is to be saved in memory means; and
memory means for saving the character code library.

21. The apparatus according to claim 15 wherein the means for selecting image information on the document sheet for reproduction according to the defined function further comprises means for highlighting the selected image information and means for providing the character code at a position associated with ,the highlighted information.

22. The apparatus according to claim 21 wherein the means for highlighting further includes means for application of a highlighting material, the material including magnetic ink.

23. The apparatus according to claim 21 wherein the means for highlighting further includes means for application of a highlighting material having an optically-detectable spectral emission characteristic.

24. The apparatus according to claim 23 wherein the highlighting material is a fluorescent ultraviolet-active ink.

25. The apparatus according to claim 15, further comprising:
   means for converting the selected image information to electronic image data; and
   means for processing the electronic image data to provide processed image data representative of the image information adjusted according to at least one function.

26. The apparatus according to claim 25, further comprising means for providing the processed image data to a remote image-forming apparatus.

27. The apparatus according to claim 25, further comprising:
   means for creating a bit map representation of the processed image data;
   means for imaging the bit map representation upon an image-bearing member to provide a latent image;
   means for developing the latent image with colored marking particles to provide a transferable image; and
   means for transferring the transferable image to a receiver.

* * * * *